No. 869,768. PATENTED OCT. 29, 1907.
J. W. AYLSWORTH & F. L. DYER.
STEAM CONDUIT.
APPLICATION FILED MAY 25, 1906.
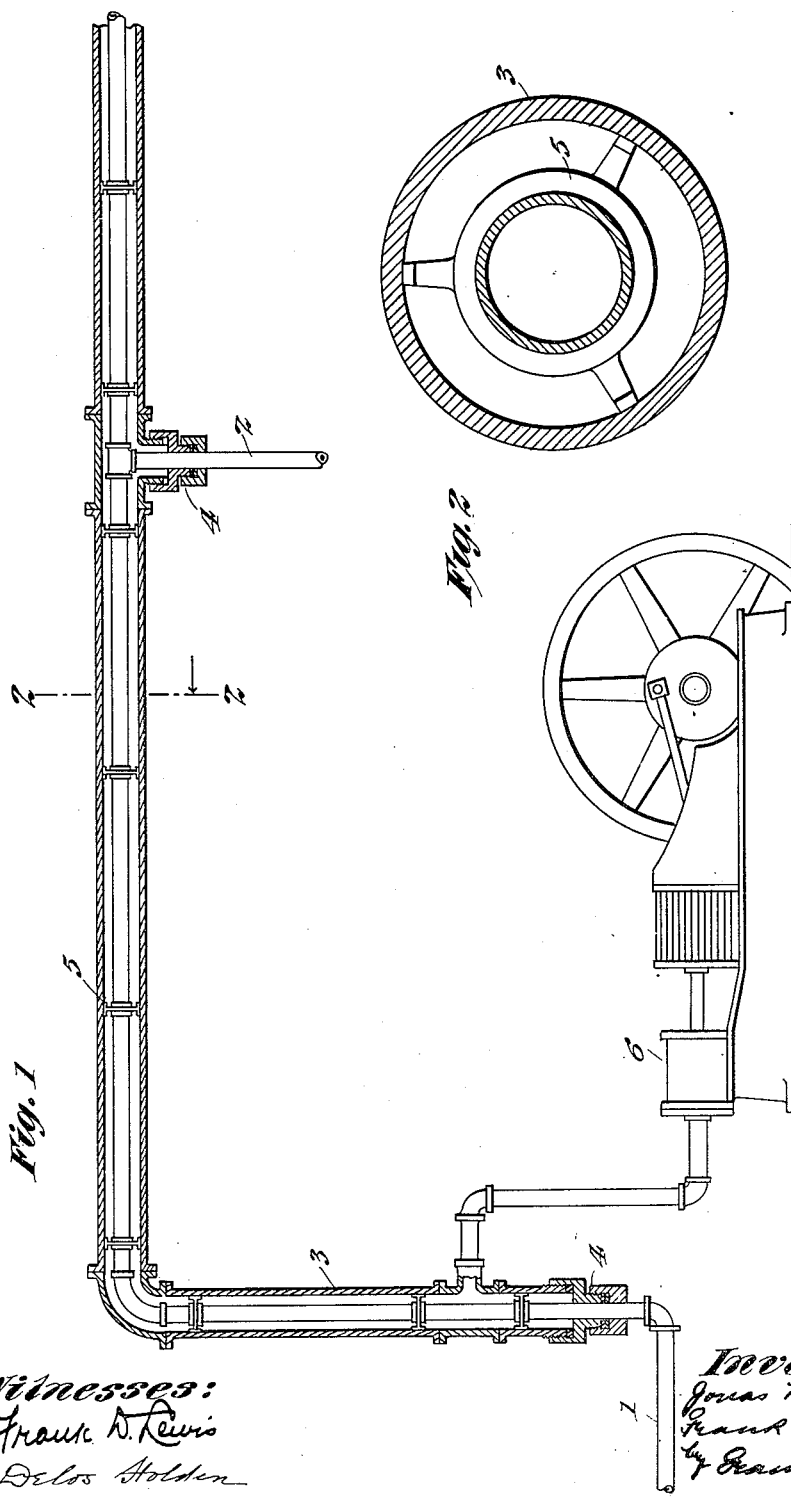

UNITED STATES PATENT OFFICE.

JONAS W. AYLSWORTH, OF EAST ORANGE, AND FRANK L. DYER, OF MONTCLAIR, NEW JERSEY.

STEAM-CONDUIT

No. 869,768.  Specification of Letters Patent.  Patented Oct. 29, 1907.

Application filed May 25, 1906. Serial No. 318,692.

*To all whom it may concern:*

Be it known that we, JONAS W. AYLSWORTH, a citizen of the United States, residing at 223 Midland avenue, East Orange, county of Essex, and State of New Jersey, and FRANK L. DYER, a citizen of the United States, residing at Montclair, county of Essex, and State of New Jersey, have invented certain new and useful Steam-Conduits, of which the following is a description.

Our invention relates to improvements in conduits for carrying steam over considerable distances, such for example, as for heating and power purposes, where the generator may be located a long distance from the point or points of application, and where the pipes may be laid in streets or other places where considerable cold may be experienced. By the expression "steam", we include of course any heated liquid or fluid from which heat will be radiated and lost, such as hot water, or compressed air carrying heat due to compression or independently imparted thereto.

Our object is to provide an improved steam conduit in which radiation and consequent losses due to condensation or loss of heat will be reduced to a minimum, and to this end the invention consists in inclosing the conduit in a jacket in which a high vacuum will be maintained so as to very greatly retard radiation.

In order that the invention may be better understood, attention is directed to the accompanying drawing, forming part of this specification, and in which—

Figure 1 is a diagrammatic view, showing a portion of the conduit in its preferred form, and Fig. 2, a section on the line 2—2 of Fig. 1. In both of these views corresponding parts are represented by the same numerals of reference.

1 represents the pipe in which the steam, hot water, compressed air, etc. is conveyed from a suitable generator or heater to the point or points of application. For instance, we show a branch 2, which in case of steam for heating purposes, may lead to a radiator or heater. The pipe or conduit may be laid in the streets and may be of very considerable length. Surrounding the conduit 1 is a jacket 3, comprising preferably a cast iron pipe somewhat larger in diameter than the conduit and having carefully packed joints 4, at points where leakage would be likely to occur. The conduit 1 is centered within the jacket 3 by spider frames 5, arranged at suitable points, as shown. The desired vacuum within the jacket is maintained by a vacuum pump 6, or in any other suitable way. Obviously, the loss due to radiation will be less as the extent of the vacuum within the jacket is increased.

Having now described our invention, what we claim as new and desire to secure by Letters Patent is as follows:—

The combination with a conduit comprising a long continuous pipe or tube, an air tight jacket surrounding the same with an interspace between, and supports spaced along said tube for centering the same, of a vacuum pump in communication with said interspace for maintaining a vacuum therein, substantially as set forth.

This specification signed and witnessed this 24th day of May, 1906.

JONAS W. AYLSWORTH.
FRANK L. DYER.

Witnesses to signature of Jonas W. Aylsworth:
ANNA R. KLEHM,
JOHN A. BOEHME.

Witnesses to signature of Frank L. Dyer:
FRANK D. LEWIS,
MARY J. LAIDLAW.